H. G. MARATTA.
COLOR CHART.
APPLICATION FILED DEC. 3, 1908.

918,068.

Patented Apr. 13, 1909.

3 SHEETS—SHEET 1.

Witnesses:
L. R. Wilkins
Guy M. Campbell

Inventor:
Hardesty G. Maratta
by Poole & Brown
Attys

H. G. MARATTA.
COLOR CHART.
APPLICATION FILED DEC. 3, 1908.

918,068.

Patented Apr. 13, 1909.
3 SHEETS—SHEET 2.

Witnesses:
George R. Wilkins
Guy M. Campbell

Inventor
Hardesty G. Maratta
by Poole & Brown
Attys

UNITED STATES PATENT OFFICE.

HARDESTY G. MARATTA, OF CHICAGO, ILLINOIS.

COLOR-CHART.

No. 918,068.  Specification of Letters Patent.  Patented April 13, 1909.

Application filed December 3, 1908. Serial No. 465,869.

*To all whom it may concern:*

Be it known that I, HARDESTY G. MARATTA, a citizen of the United States, and a resident of Chicago, in the county of Cook and State of Illinois, have invented certain new and useful Improvements in Color-Charts; and I do hereby declare that the following is a full, clear, and exact description thereof, reference being had to the accompanying drawings, and to the characters of reference marked thereon, which form a part of this specification.

This invention relates to an improved color chart for the use of artists and artisans and it consists in the matters hereinafter described and pointed out in the appended claims.

In the accompanying drawings illustrating my invention,—Figures 1 to 5 indicate five parts or sections of a color chart embodying my invention and which severally bear a plurality of color spaces, the colors of which are severally indicated by letters and numbers as hereinafter stated.

Figure 1:
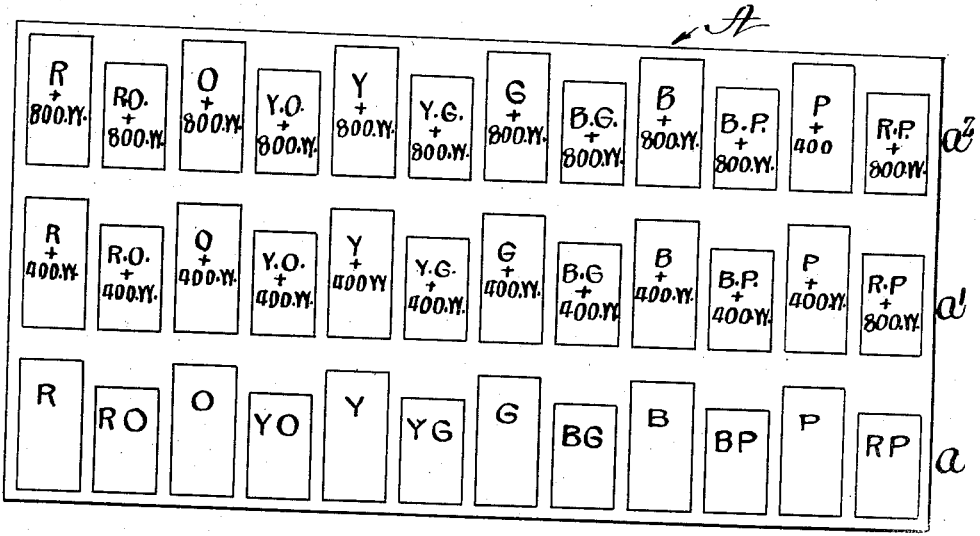

The section of the chart indicated by A in Fig. 1 has at its lower portion a series of twelve spaces or panels, indicated by a, corresponding with the chromatic scale of the primary and secondary colors and admixtures thereof, these being indicated in the drawings by the initial letters of the several colors. The set or series constituting said scale includes three primary color spaces, to-wit, red, yellow and blue, three secondary color spaces, to-wit, orange, purple and green. These six color spaces constitute what may be called the principal color spaces of section A. Said section A is also provided with six subordinate color spaces which are arranged in alternation with the primary and secondary, or principal, color spaces and the colors of which correspond with the colors produced by an admixture of the colors of said primary and secondary color spaces. These twelve color spaces are arranged in their natural order, in which the colors appear in the solar spectrum.

Above the set or row a of color spaces in which the colors are in their full and natural strength or intensity are arranged two other corresponding sets or series $a^1$, $a^2$ in which the intensity of the colors is reduced or modified by the addition of white pigment or other reducing medium in varying proportions. The proportion of reducing medium employed is indicated in the drawings by the figures 400 and 800, these indicating the proportions of the reducing medium to the color pigment assuming that the number 1000 represents a quantity or volume of the reducing medium equal to that of the color pigment.

Figure 5:
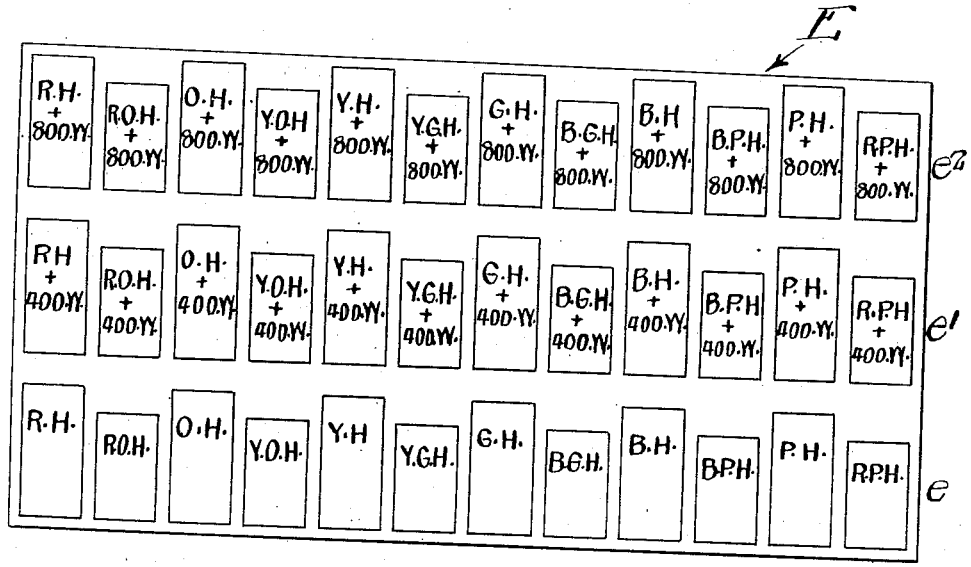

The section of the chart indicated by E in Fig. 5 of the drawings has at its lower part a set or series of twelve color spaces, indicated by e. Six of these are principal color spaces and they correspond with the colors obtained by the admixture of the three secondary colors, to-wit, orange, green and purple of the six principal color spaces of section A. These are, for convenience, called hues, and are indicated in the drawings by H. Three of these six derivative colors or hues are tertiary admixtures, produced by combining or mixing the three secondary colors. These consist of red hue, produced by the admixture of purple and orange; blue hue, produced by the admixture of green and purple, and yellow hue, produced by the admixture of orange and green. The other three are quaternary derivative colors produced by admixtures of the three last named tertiary colors. These are green hue, produced by the admixture of blue hue and yellow hue, orange hue, produced by the admixture of yellow hue and red hue, and purple hue, produced by the admixture of red hue and blue hue. These six hues are arranged on the section E of the chart in the natural order of the colors, to-wit, red hue, orange hue, yellow hue, green hue, blue hue and purple hue. The set of color spaces e on the chart also include six subordinate or intermediate color spaces corresponding with the colors, also conveniently called hues, produced by the admixture of the colors of the six principal color spaces at either side thereof, as arranged in their natural order, to-wit, red orange hue, yellow orange hue, yellow green hue, blue green hue, blue purple hue and red purple hue.

The chart section indicated by E in Fig. 5 is also provided with two rows or series of color sections marked $e^1$ and $e^2$ corresponding in color with the color sections in the set marked e excepting that they are modified by the addition of a reducing medium in varying proportions, as hereinbefore described in connection with the chart section A.

Figure 2:
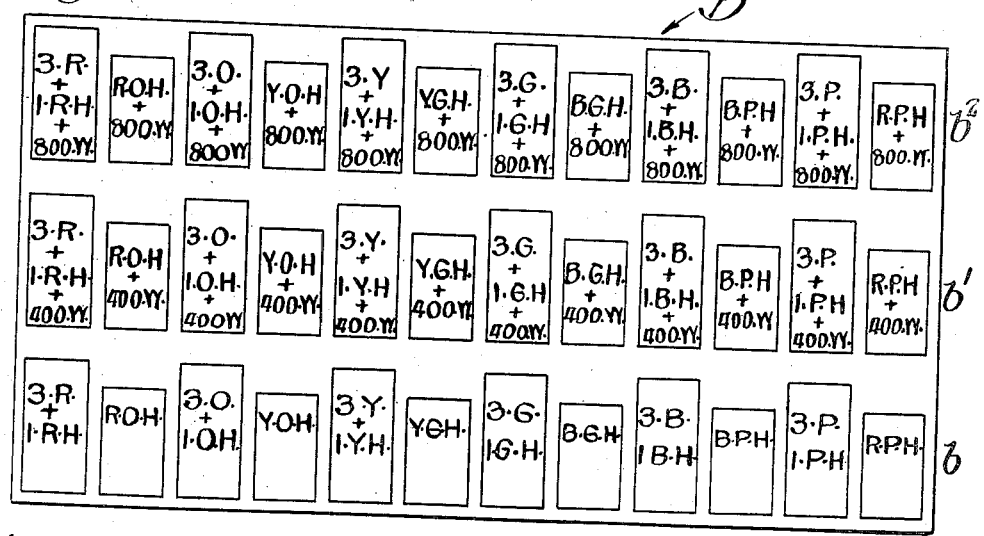
Figure 3:
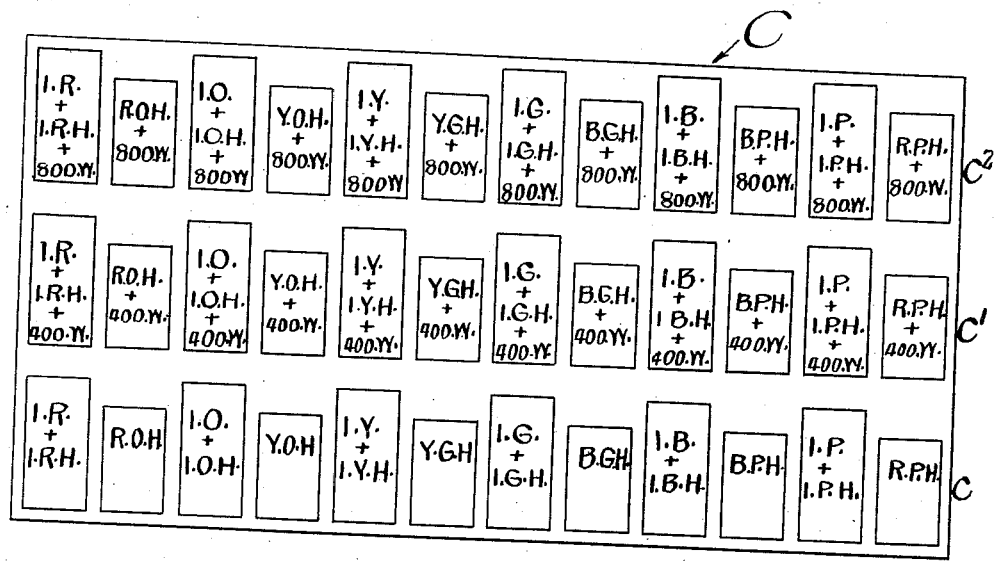
Figure 4:
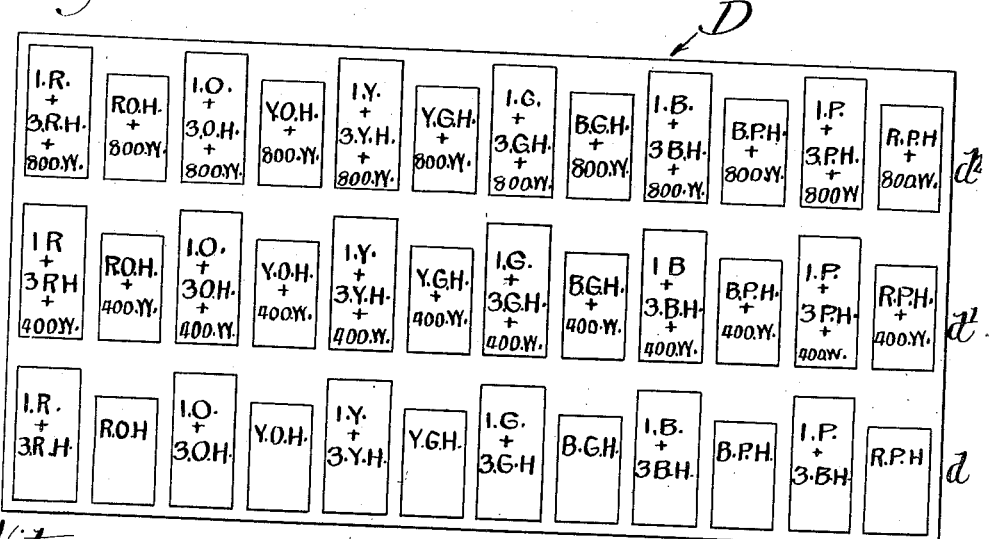

The chart sections indicated by B in Fig. 2, C in Fig. 3, and D in Fig. 4, each embrace a row or set of color spaces severally indicated by b, c and d. Each row consists of a color scale in which the colors are arranged in their natural order and which embraces six color spaces corresponding with the subordinate color spaces of section E of the chart, and six subordinate color spaces, in which the hues are modified by the addition thereto of certain definite proportions of the primary and secondary colors of the principal color spaces of chart A, thereby constituting a chromatic scale of red orange hue, yellow orange hue, yellow green hue, blue green hue, blue purple hue and red purple hue, with intervening color spaces corresponding in color with admixtures produced by the combination of the six primary and secondary colors with the said six hues, in varying proportions. In the section B each primary and secondary color is combined with its corresponding hue in the proportion of three to one, that is to say, the first color section will correspond with the admixture of three parts of red with one part of red hue and the others in corresponding proportions. In the section, indicated by C in Fig. 3, each primary and secondary color will be combined with the corresponding hues in the proportion of one part of the color to one part of the hue. In the section indicated by D, Fig. 4, the primary and secondary colors will be combined with their corresponding hues in the proportion of one part of the primary and secondary colors to three parts of the corresponding hues.

The chart sections indicated by B, C and D are severally provided with two rows or series of color spaces marked $b^1$, $b^2$, $c^1$, $c^2$, $d^1$, $d^2$, corresponding in color with the main color spaces, but modified by the addition of a reducing medium in varying proportions, as are the corresponding rows or series $a^1$, $a^2$ and $e^1$, $e^2$ of the chart sections A and E. The reducing medium employed may be a white, black or neutral pigment. Moreover, a colorless liquid, such as varnish, may be used as the reducing medium, which will render the color pigments used in preparing the color spaces more or less transparent or translucent, so that when the same are applied to a white surface the intensity of the colors will be reduced in the same manner as by mixing white pigment with the color pigment, except that in the use of white pigment the colors will be opaque, while in the use of a transparent reducing medium the colors will be more or less transparent.

The corresponding and complemental colors on all of the charts made as described will invariably harmonize with each other. The necessary harmonious relations between the derivative colors, called hues, and the six primary and secondary colors will be readily seen when it is observed that each hue, to-wit, red hue, blue hue, yellow hue, orange hue, green hue and purple hue contains an increment of the opposing and complementary colors. Thus, red hue contains an increment of green, or the combination of blue and yellow, blue hue contains an increment of orange, or the combination of red and yellow, yellow hue contains an increment of purple, or the combination of blue and red. Similarly, orange hue contains an increment of blue, green hue contains an increment of red, and purple hue contains an increment of yellow. In other words, every color hue produced by combination or admixture of the primary colors contains as its components all three of the same; it being of course understood that in the red, blue and yellow hues these colors predominate; likewise, in the orange, green and purple hues the latter colors predominate. The same fact is true with respect to the other derivative colors or hues, which have the same relation to the three primary colors, and which are produced by admixtures of the primary and secondary colors with the corresponding hues in varying proportions, as hereinbefore set forth, and as indicated by the numbers and letters on the color spaces of the sections B, C and D.

The color chart constructed as shown and hereinbefore described is intended to enable a person to select a plurality of colors which will certainly harmonize with each other without depending upon his judgment or color-sense, but by following a fixed rule based on the arrangement of the color spaces on the chart. If the several sections of the chart be arranged side by side in the order shown in the drawings, or in any other order, the color space sixth in order in either direction from any given color space will show a harmonizing contrasting color and the color space twelfth in order from said given color space will indicate a harmonizing complemental color. Thus, if the orange space of section A be taken as the starting point, counting toward the right, the sixth space or blue will be the contrasting harmonizing color, the twelfth space (three parts orange and one part orange hue) will be a corresponding harmonizing color, and, by counting throughout the series of sections, the eighteenth (three parts blue and one part blue hue) thirtieth (one part blue and one part blue hue), forty-second (one part blue and three parts blue hue) and fifty-fourth (blue hue) spaces will show the contrasting harmonizing colors, while the twenty-fourth (one part orange and one part orange hue), thirty-sixth (one part orange and three parts orange hue), and the forty-eighth (orange hue) spaces will show the corresponding harmonizing colors.

The practical utility of a chart as described may be seen from the following: If a printer wishes to print on paper having a background of a certain color, an ornamental design in two colors, one of the same general color as the paper and another of a contrasting color, he may select as a back-ground color a certain tint, such as three parts yellow and one part yellow hue plus 800 white, as found in section B of the chart. For a corresponding color of darker hue, by following the rule stated he may select the color indicated by the space marked one part yellow and three parts yellow hue, from section D, and for a contrasting color he may select the color indicated by the space marked one part purple and three parts blue hue, from said section D. All of these colors will perfectly harmonize, as will any other three colors similarly ascertained from the chart. Moreover, what may be called half-tone variations from the colors indicated by following the above stated rule may be employed, with certainty as to the resulting effect produced. Thus, if yellow orange be one color employed, instead of using a contrasting color, the blue purple hue from section D of the chart, one of the half-tones at either side of the same may be used, as one part blue plus three parts blue hue, or one part purple plus three parts blue hue, and in either case a harmonious color effect will be produced.

It will be observed that in sections B, C, D and E of the chart the six colors called hues are repeated in all of the sections. This is done in order that each section may be complete in itself and may be separately used. Thus, if a harmonizing contrasting color to that of the space marked "1.Y plus 3 Y.H." in Fig. 4 be desired, counting six spaces therefrom will give "1.P. plus 3 B.H." as such contrasting harmonizing color, and one of the half-tone variations therefrom, to-wit, blue purple hue or red purple hue, may be selected.

It is to be understood that a color chart made in accordance with my invention may have a greater or less number of sections than shown in the accompanying drawings. Sections A and E alone may be used, or in addition to said sections A and E the chart may include one only or any desired number of sections embracing derivative hues produced by the combinations of the primary and secondary colors and the corresponding hues, in varying proportions. Ordinarily, however, a greater number than three sections devoted to such derivative hues will not be necessary for practical purposes, because the further development of derivative hues for the production of other scales of color spaces would give in the different chart-sections color spaces differing from each other to such a slight extent as not to be distinguishable by an untrained observer.

I claim as my invention:—

1. A color chart comprising a plurality of sections, each of which is provided with twelve color spaces arranged in the order of the solar spectrum, one of said sections having six principal primary and secondary color spaces arranged in alternation with six subordinate color spaces corresponding with admixtures of the colors of the primary and secondary color spaces between which they are located, and another of said sections having six principal color spaces, three of which correspond with hues formed by admixtures with each other of the colors of the three principal secondary color spaces of the first named section, and three of which correspond with the hues produced by the admixture with each other of the hues of the other three principal color sections between which they are located, said six principal color spaces being arranged in alternation with six subordinate color spaces corresponding with the hues obtained by admixture of the hues of the principal color spaces between which they are located.

2. A color chart comprising a plurality of sections, each of which is provided with twelve color spaces arranged in the order of the solar spectrum, one of said sections having six principal primary and secondary color spaces arranged in alternation with the six subordinate color spaces corresponding with admixtures of the colors of the primary and secondary color spaces between which they are located, another of said sections having six principal color spaces, three of which correspond with hues formed by admixtures with each other of the colors of the three principal secondary color spaces of the first named section, and three of which correspond with the hues produced by the admixture with each other of the hues of the other three principal color sections between which they are located, said six principal color spaces being arranged in alternation with six subordinate color spaces corresponding with the hues obtained by admixture of the hues of the principal color spaces between which they are located, and another of said sections having six principal color spaces corresponding with the hues of the subordinate color spaces of the second named section, arranged in alternation with six subordinate color spaces corresponding with admixtures of the colors of the six principal color spaces of the first named section with the hues of the six principal color spaces between which they are located.

3. A color chart comprising a plurality of sections, each of which is provided with twelve color spaces arranged in the order of the solar spectrum, one of said sections having six principal primary and secondary color spaces arranged in alternation with six subordinate color spaces corresponding with admixtures of the colors of the primary and secondary color spaces between which they are located, another of said sections having six principal color spaces, three of which correspond with hues formed by admixtures with each other of the colors of the three principal secondary color spaces of the first named section, and three of which correspond with the hues produced by the admixture with each other of the hues of the other three principal color sections between which they are located, said six principal color spaces being arranged in alternation with six subordinate color spaces corresponding with the hues obtained by admixture of the hues of the principal color spaces between which they are located, and a plurality of other sections each having six principal color spaces corresponding with the hues of the subordinate color spaces of the second named section, arranged in alternation with six subordinate color spaces corresponding with admixtures of the colors of the six principal color spaces of the first named section with the hues of the six principal color spaces between which they are located, the subordinate color spaces in said several last named sections differing from each other and corresponding with color-admixtures obtained by combining in different proportions the colors of the six principal color spaces of the first named section with the hues of said principal color spaces between which they are located.

4. A color chart comprising a plurality of sections, each of which is provided with twelve color spaces arranged in the order of the solar spectrum, one of said sections having six principal primary and secondary color spaces arranged in alternation with six subordinate color spaces corresponding with admixtures of the colors of the primary and secondary color spaces between which they are located, another of said sections having six principal color spaces, three of which correspond with hues formed by admixtures with each other of the colors of the three principal secondary color spaces of the first named section, and three of which correspond with the hues produced by the admixture with each other of the hues of the other three principal color sections between which they are located, said six principal color spaces being arranged in alternation with six subordinate color spaces corresponding with the hues obtained by admixture of the hues of the principal color spaces between which they are located, each of said sections having also a plurality of supplementary color spaces associated with each of the principal and subordinate color spaces thereon, and corresponding with the colors obtained by an admixture of the color of said principal and subordinate color spaces with a reducing medium in varying proportions.

5. A color chart comprising a plurality of sections, each of which is provided with twelve color spaces arranged in the order of the solar spectrum, one of said sections having six principal primary and secondary color spaces arranged in alternation with the six subordinate color spaces corresponding with admixtures of the colors of the primary and secondary color spaces between which they are located, another of said sections having six principal color spaces, three of which correspond with hues formed by admixtures with each other of the colors of the three principal secondary color spaces of the first named section, and three of which correspond with the hues produced by the admixture with each other of the hues of the other three principal color sections between which they are located, said six principal color spaces being arranged in alternation with six subordinate color spaces corresponding with the hues obtained by admixture of the hues of the principal color spaces between which they are located, and another of said sections having six principal color spaces corresponding with the hues of the subordinate color spaces of the second named section, arranged in alternation with six subordinate color spaces corresponding with admixtures of the colors of the six principal color spaces of the first named section with the hues of the six principal color spaces between which they are located, each of said sections having also a plurality of supplementary color spaces associated with each of the principal and subordinate color spaces thereon, and corresponding with the colors obtained by an admixture of the color of said principal and subordinate color spaces with a reducing medium in varying proportions.

In testimony, that I claim the foregoing as my invention I affix my signature in the presence of two witnesses, this 28th day of November A. D. 1908.

HARDESTY G. MARATTA.

Witnesses:
GEORGE R. WILKINS,
G. J. BRYCE.